US005129160A

United States Patent [19]

Bell

[11] Patent Number: 5,129,160

[45] Date of Patent: Jul. 14, 1992

[54] FEED MECHANISM FOR A CUTTING DEVICE

[75] Inventor: Don A. Bell, Portland, Oreg.

[73] Assignee: Blount, Inc., Portland, Oreg.

[21] Appl. No.: 710,186

[22] Filed: Jun. 4, 1991

[51] Int. Cl.[5] ........................ B23D 59/00; B26D 7/06; B26D 1/46

[52] U.S. Cl. ........................................ 30/383; 83/437; 83/796

[58] Field of Search .................... 30/383, 385; 83/431, 83/437, 788, 796, 464

[56] References Cited

U.S. PATENT DOCUMENTS

| | | | |
|---|---|---|---|
| 3,154,120 | 10/1964 | Lesher | 83/796 |
| 3,517,711 | 6/1970 | Reeser et al. | 83/796 |
| 3,604,479 | 9/1971 | Jordan | 83/796 |
| 4,002,329 | 1/1977 | Petrowski | 83/437 |
| 4,210,049 | 7/1980 | Gauthier | 83/788 |
| 4,494,429 | 1/1985 | Frame | 83/437 |
| 4,625,781 | 12/1986 | Miller et al. | 30/385 |

*Primary Examiner*—Douglas D. Watts
*Assistant Examiner*—Paul M. Heyrana, Sr.
*Attorney, Agent, or Firm*—Robert L. Harrington

[57] ABSTRACT

A chain saw feed mechanism includes an arm pivotally mounted to the chain saw and carrying a dog for pivotally engaging the workpiece at the kerf. Thrusting the chain saw along the longitudinal axis of the guide bar moves the guide bar along an arc concentric to the point of workpiece engagement and thereby cuts laterally through the workpiece. Longitudinal thrusting force applied by the operator transfers via the lever arm into lateral feed force needed for cutting the workpiece. The feed mechanism is particularly useful in aggregate cutting applications, where the chain saw is heavy and large cutting forces are needed to pass the saw through the aggregate.

15 Claims, 5 Drawing Sheets

FEED MECHANISM FOR A CUTTING DEVICE

BACKGROUND OF THE INVENTION

The present invention relates generally to power cutting devices and particularly to a feed mechanism for assisting in application of a feed force for a cutting device.

Hand operated chain saws are used in a variety of applications from wood cutting to aggregate cutting. To cut a workpiece, the operator must move the guide bar through the workpiece by urging the moving saw chain against the workpiece. Bucking teeth affixed to the chain saw body and protruding toward the workpiece previously have assisted in providing such a feed force, i.e., the force of the saw chain against the workpiece to accomplish cutting. The bucking teeth engage the workpiece adjacent the kerf as a pivot point for rocking the chain saw body and moving the saw chain within the workpiece with the aid of leverage. Although the mechanical advantage provided by bucking teeth aids in providing a feed force, in many cases, due to the magnitude of cutting forces required or necessary orientation of the chain saw, the operator may have difficulty. This is especially true during extended periods of use where large magnitude cutting forces or difficult saw orientation is required.

In certain applications the combined weight of the chain saw and the force needed to urge the saw chain through the workpiece can be burdensome. For example in aggregate cutting, the chain saw weight can exceed 30 pounds and the required feed force may be as much as 70 pounds. For up-cuts the operator must not only carry the weight of the chain saw, but also the required feed force for a total operator applied force exceeding 100 pounds. For horizontal cuts the operator may have difficulty maintaining a desired horizontal orientation, as by vertically supporting the chain saw, while applying the necessary feed force, as by pushing the saw in a horizontal plane and parallel to the line of cut.

Another problem encountered in aggregate cutting is use of bucking teeth for engagement of the aggregate material. When applied to softer material, e.g., wood products, bucking teeth are well adapted for secure engagement since they dig into the product surface. Aggregate material, however, presents a much harder and less resilient workpiece and requires a substantially greater magnitude feed force. Bucking teeth either cannot penetrate or may tend to crumble the aggregate material upon engagement and provide a less secure purchase. As conventionally applied to aggregate material, bucking teeth need be extremely hard and sharp, an expensive requirement, to obtain any significant engagement of the workpiece as a leverage point.

Accordingly, a chain saw would desirably include a mechanism to aid the operator in engaging the workpiece and developing the necessary feed force, especially where large magnitude feed force is required or difficult saw orientation is necessary.

SUMMARY OF THE INVENTION

A feed mechanism according to a principal embodiment of the present invention includes a lever arm pivotally mounted to a cutting device and adapted for pivotal engagement of the workpiece whereby thrusting of the cutting device along a first axis results in feed force along a second axis. As applied to a chain saw cutting device, the present invention converts longitudinal thrusting force along the chain saw guide bar and toward the workpiece into lateral feed force for moving the guide bar through the workpiece in cutting fashion.

In accordance with one aspect of the present invention, a feed mechanism of a chain saw may be adapted for engaging the kerf portion of a workpiece for more secure engagement of the workpiece. As applied to aggregate cutting, this aspect of the present invention provides improved engagement of the aggregate material.

BRIEF DESCRIPTION OF THE DRAWINGS

For a better understanding of the invention, and to show how the same may be carried into effect, reference will now be made, by ways of example, to the accompanying drawings described as follows.

DETAILED DESCRIPTION

Figure 1:
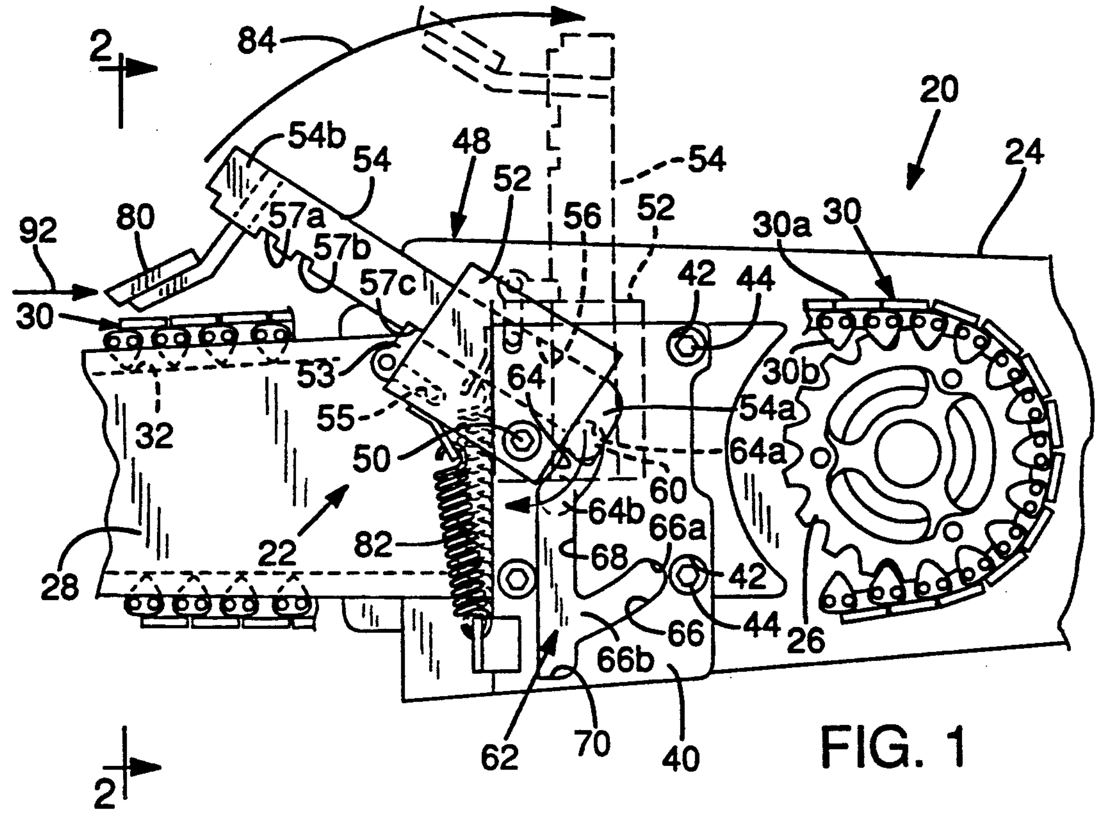
FIG. 1 is a side view partially cut away of a chain saw including a feed mechanism in accordance with the present invention.

FIG 1 is a side view partially broken away of an aggregate cutting chain saw 20 including a feed mechanism 22 according to the present invention. Chain saw 20 includes a power head 24, a drive sprocket 26, a guide bar 28 mounted upon power head 24, and a saw chain 30 slidably disposed about the periphery of guide bar 28 within a guide bar groove 32. Drive sprocket 26 engages chain 30 for movement of chain 30 about guide bar 28. In the illustration of FIG. 1 only two portions of saw chain 30 are shown, but it will be understood that saw chain 30 comprises a continuous series of links, including cutter links 30*a* and drive links 30*b*, disposed about the periphery of guide bar 28 and adapted for engagement by drive sprocket 26.

Feed mechanism 22 includes a cam block 40 mounted upon guide bar 28. Cam block 40 includes counter sunk mounting apertures 42 through which mounting bolts 44 pass and threadably engage a portion of the guide bar mounting structure (not shown). As mounted in this fashion, it will be understood that cam block 40 is fixed relative to i.e., carried by, guide bar 28.

A lever arm assembly 48 of feed mechanism 22 pivotally couples to cam block 40 at the pivot pin 50. Lever arm assembly 48 includes a pivot block 52 and a lever arm 54. Lever arm 54 slides within a lever arm channel 56 of pivot block 52, but may be locked relative to block 52 for selected lever arm length. More particularly, lever arm 54 includes notch formations 57*a*, 57*b* and 57*c* along its length and pivot block 52 carries a pawl 53 adjacent channel 56 and adapted to engage one of notches 57. Pawl 53 is pivotally mounted upon block 52 at pin 55 and is spring biased (not shown) toward the lever arm 54. Movement of lever arm 54 within channel 56 and alignment of a selected notch 57 with pawl 53 accomplishes positioning and locking of lever arm 54 within channel 56. Lever arm 54 is thereby locked relative to block 52 in a position corresponding to engagement of pawl 53 within a selected one of notches 57. A cam follower 60 mounts at the proximal end 54*a* of lever arm 54 extending below, in the view of FIG. 1, the pivot block 52 and into cam block 40.

Cam block 40 includes a cam follower groove 62 adapted for receiving the cam follower 60 of lever arm 54. The width of groove 62 corresponds to the diameter of cam follower 60 whereby positioning of cam 60 is restricted to the configuration of groove 62. Cam follower groove 62 includes a feed portion 64 of semi-circular shape and concentric to the pivot pin 50. A bucking portion 66 of groove 62 is also semi-circular in shape and concentric to the pivot pin 50, but spaced a greater distance from pin 50. Each portion 64 and 66 includes a corresponding closed end 64*a* and 66*a*, respectively, as its most counter clockwise portion. A straight portion 68 of groove 62 defines and couples the open ends 64*b* and 66*b* of portions 64 and 66, respectively. Straight portion 68 terminates at a park portion 70 near the bottom of cam block 40 and spaced most distant from pivot pin 50. Park portion 70 captures cam 60 against rotation relative to pin 50.

Figure 2:
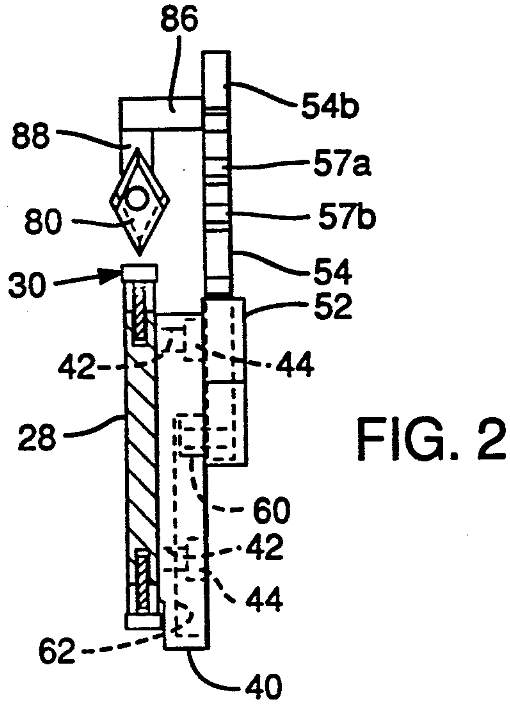
FIG. 2 is a sectional view of the guide bar and feed mechanism of FIG. 1 taken along lines 2—2 of FIG. 1.

In FIG. 2, taken along lines 2—2 of FIG. 1, lever arm 54 moves in a plane substantially parallel to, but spaced from, the plane of guide bar 28. Lever arm 54 includes at its distal end 54*b* an extension bar 86 for coupling lever arm distal end 54*b* and a mounting structure 88. Mounting structure 88 carries a workpiece engaging dog 80. Dog 80 is a generally wedge shaped formation adapted for pivotal engagement of the workpiece at the kerf provided by chain saw 20. In this manner, dog 80 is carried upon lever arm 54 but positioned within the plane of guide bar 28. With reference to FIGS. 1 and 2, cam follower 60 extends into the cam groove 62 for movement within the feed portion 64 of groove 62. More particularly, with pawl 53 engaging the notch formation 57*c* of lever arm 54, cam follower 60 is restricted to movement within the feed cam portion 64 as block 52 pivots about pin 50.

As discussed more fully below, in a bucking mode, shown in FIG. 7, pawl 53 engages notch formation 57*b* of lever arm 54 and movement of cam follower 60 is restricted to bucking portion 66 of groove 62 as block 52 pivots about pin 50. Similarly, in a park mode pawl 53 engages notch formation 57*a* of lever arm 54 and park portion 70 captures cam follower 60 against rotation about pin 50. To accomplish such selected positioning of cam follower 60 within cam groove 62 pivot block 62 is moved to its vertical position, illustrated in phantom in FIG. 1, with cam follower 60 in straight portion 68. Pawl 53 is then disengaged from lever arm 54. Lever arm 54 then moves vertically, in the view of FIG. 1, for movement of cam follower 60 within the straight portion 68 of groove 62. Engagement of pawl 53 within a selected one of notches 57 locks lever arm 54 in position.

A spring 82 couples the pivot block 52 and the cam block 40 to bias lever arm 54 to swing counter clockwise, in view of FIG. 1, and urge dog 80 toward a workpiece. Lever arm 54 pivots in the clockwise direction, indicated by reference numeral 84, in response to a reactive force vector 92 originating from the workpiece and in response to thrusting motion of the chain saw 20 into the workpiece. Cam follower 60 is biased toward the closed end 64*a* of feed portion 64 whereat the extent of dog 80 travel toward chain 30 is limited, i.e., when cam follower 60 hits the closed end 64*a*, dog 80 is close to but not touching chain 30.

Feed mechanism 22 thereby provides a lever arm 54 pivotally mounted to the chain saw 20 and carrying at its distal end 54*b* a dog 80 adapted for pivotal engagement at the kerf of a workpiece.

Figure 3:
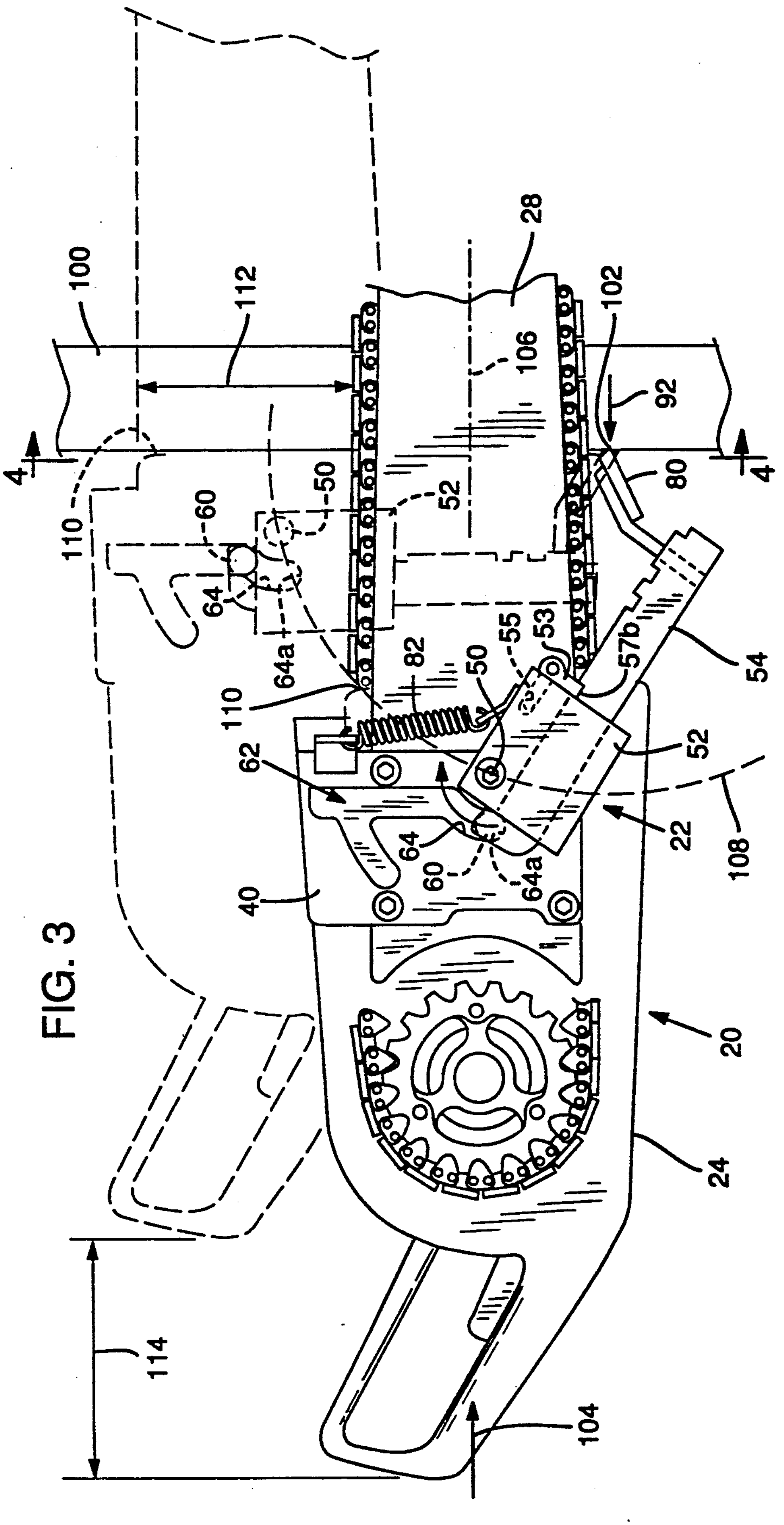
FIG. 3 illustrates the chain saw and feed mechanism of FIG. 1, but inverted relative to the orientation of FIG. 1 and shown engaging a workpiece with the aid of the feed mechanism.
Figure 4:
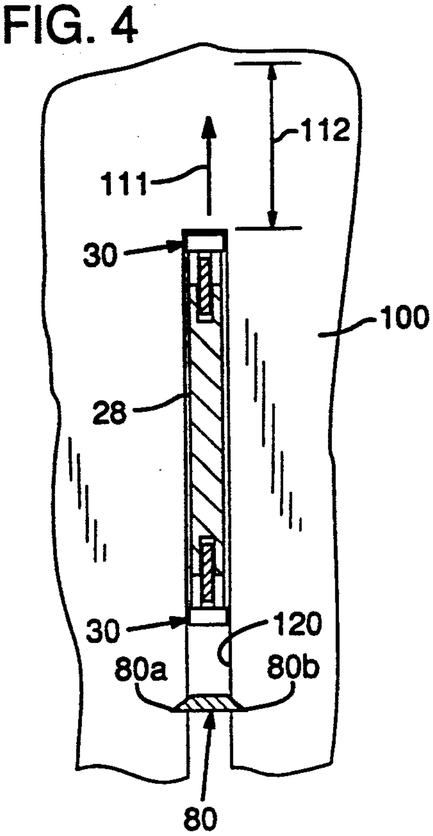
FIG. 4 is a sectional view taken along lines 4—4 of FIG. 3 and detailing engagement of the workpiece by the feed mechanism of FIG. 3.

FIGS. 3 and 4 illustrate use of the feed mechanism 22 during an up-cut operation on an aggregate wall 100 along a vertical line of cut 111. In FIG. 3, chain saw 20 is inverted relative to its orientation in FIG. 1 for performing the up-cut operation. The guide bar 28 is first positioned within a kerf 120 (FIG. 4) of wall 100, e.g. as by a plunge cut, previous up-cut, or pre-cut with a circular saw. The feed mechanism 22 is positioned as shown in FIG. 3 to assist in developing the required up-cut feed force. Cam follower 60 rests at the closed end 64*a* of feed portion 64. Dog 80 pivotally engages wall 100 at the point 102 along the kerf 120. As the operator delivers an applied force vector 104 horizontally and parallel to the longitudinal axis 106 of chain saw 20, lever arm 54 pivots in response to reactive force vector 92, i.e., pivots relative to wall 100 about the point 102 and pivots relative to chain saw 20 about pin 50.

As a result, chain saw 20 moves along an arc 108 until the leading face 110 of chain saw 20 abuts the wall 100 and stops further longitudinal movement of saw 20. Also, cam follower 60 moves from the closed end 64*a* of feed cam portion 64 as pivot block 52 pivots about pin 50. The final position of chain saw 20 is shown in phantom in FIG. 3 along the intended line of cut 111 (FIG. 4). In so moving along arc 108, chain saw 20 cuts vertically, in the view of FIG. 3, by the cutting distance 112 for a given thrust distance 114 of chain saw 20.

Figure 5:
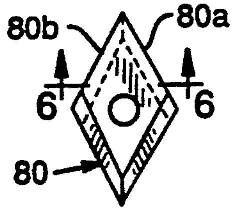
FIGS. 5 and 6 illustrate a workpiece engaging member of the feed mechanism of FIG. 1.
Figure 6:
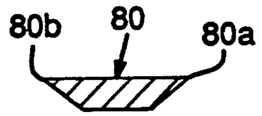

FIG. 4 is a sectional view of the guide bar 28, dog 80 and wall 100 of FIG. 3 taken along lines 4—4 of FIG. 3. FIGS. 5 and 6 illustrate the configuration of dog 80 as generally diamond shaped and having a leading wedge-shaped kerf engaging portion including edges 80*a* and 80*b*. Dog 80 engages the kerf 120 at edge portions 80*a* and 80*b* to provide a pivotal coupling of lever arm 54 and wall 100.

It will, therefore, be appreciated that the operator of chain saw 20 may accomplish a vertical up-cut by application of a horizontally applied force vector 104. The leverage provided by the feed mechanism 22 aids the operator in developing the necessary feed force, i.e, force perpendicular to guide bar 28 and against the material of wall 100. Once the up-cut operation is accomplished, the operator retracts saw 20 from wall 100 and spring 82 returns pivot block 52 to its original position in preparation for the next up-cut operation.

The feed mechanism 22 is particularly useful in aggregate cutting applications where large magnitude feed forces are required. For example, without the aid of the feed mechanism 22, the operator would have to apply feed force having components parallel to the intended line of cut, i.e., parallel to kerf 120. In an up-cut, this would include lifting the weight of the chain saw 20, e.g., on the order of 30–40 pounds and the required magnitude of feed force of the saw chain 30 against the wall 100, e.g., on the order of 70 pounds. With the aid of the feed mechanism 22, however, the operator need only apply the horizontal force vector 102 to chain saw 20. It may be appreciated that application of such a horizontal force vector, essentially leaning into the wall 100, is much more convenient and less strenuous than lifting the chain saw 20 vertically against the workpiece.

The mechanical advantage provided by feed mechanism 22 corresponds to the relative magnitude of thrust distance 114 and the cut distance 112. In other words, the mechanical advantage is a function of the portion of arc 108 through which chain saw 20 moves during the cut. More particularly, the positioning of pivot pin 50 on chain saw 20, the spacial separation of pivot pin 50 and dog 80, and the initial or biased position of lever arm assembly 48 determines the operative portion of arc 108. With reference to the orientation of FIG. 3, if the chain saw 20 moves through a substantially horizontal portion of arc 108, greater feed force is obtained at the expense of a longer thrust distance 114. Conversely, for movement of chain saw 20 through substantially vertical portions of arc 108, a shorter thrust distance 114 is possible, but at the expense of a lesser magnitude of feed force.

It will be appreciated by those skilled in the art that many modifications in terms of thrust distance 114, cutting distance 112, and the resulting feed force may be made in the context of particular applications. For example, in aggregate cutting applications, it may be desirable to require a longer thrust distance 114 and develop greater feed force at the expense of a shorter cutting distance 112. In other applications, such as in wood cutting where a lesser feed force is required, it may be desirable to provide a relatively greater cutting distance 112 where sufficient feed force may be developed to cut the wood product with a short thrust distance 114.

While the feed mechanism 22 has been shown for an up-cut operation, it should be apparent that the feed force developed in response to longitudinal thrusting of chain saw 20 is available regardless of the orientation of saw 20. Accordingly, feed mechanism 22 is available for horizontal cuts as well as down-cuts.

Figure 7:
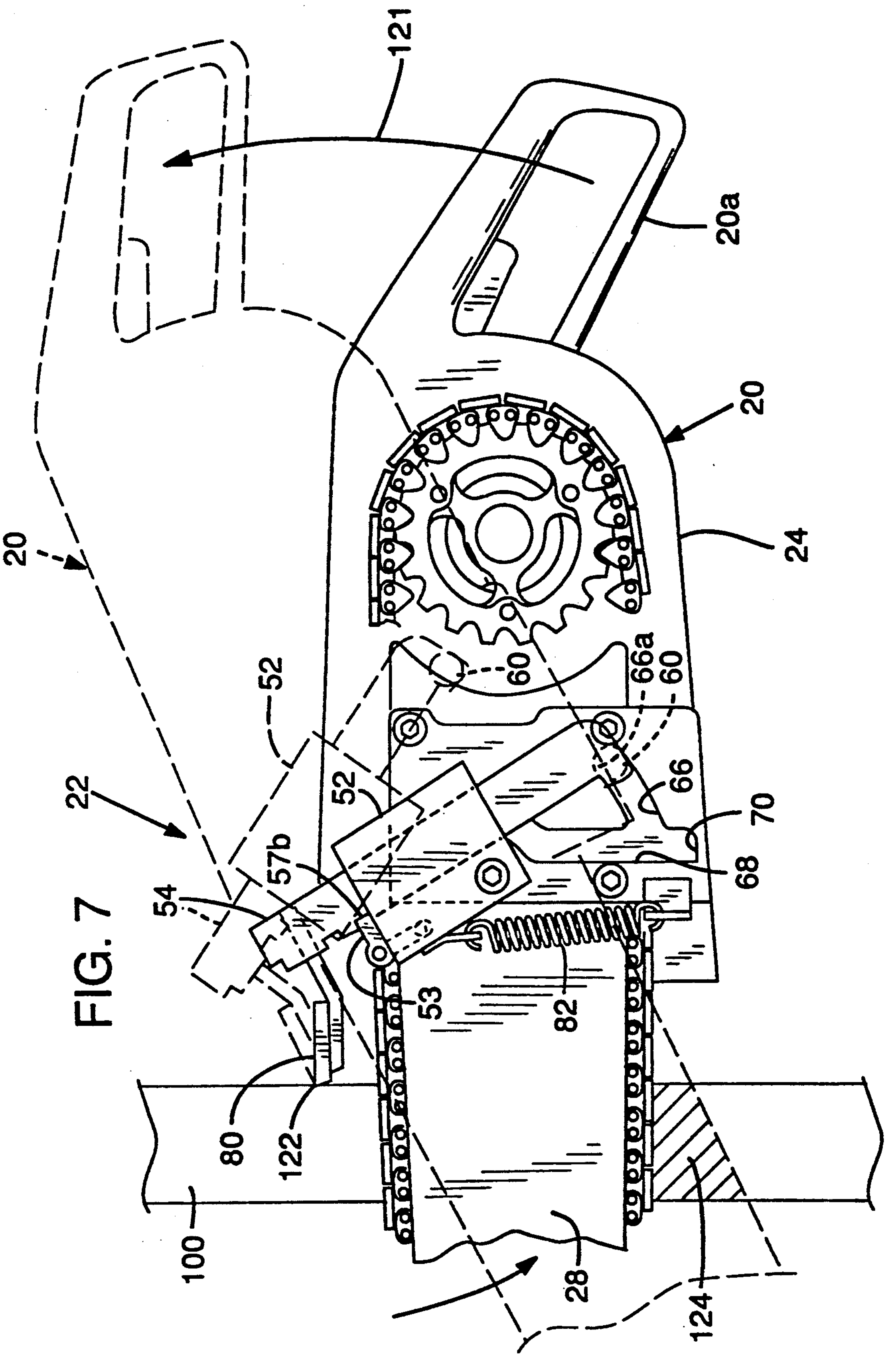
FIG. 7 is a side view of the chain saw and feed mechanism of FIG. 1, but with the feed mechanism in a down-cut mode.

FIG. 7 illustrates the feed mechanism 22 in a bucking mode. In FIG. 7, lever arm 54 has been re-positioned relative to pivot block 52 by engagement of pawl 53 in notch formation 57*b* of lever arm 54. In such configuration, cam follower 60 rests within the bucking portion 66 of groove 62 and by virtue of spring 82, can follower 60 rests against the closed end 66*a* of bucking portion 66. Guide bar 28 of chain saw 20 rests within the kerf of wall 100 and dog 80 engages the kerf in wall 100 at a point 122 as previously described. The operator lifts chain saw 20 upward, as indicated by arrow 120 in FIG. 7, to pivot chain saw 20 about pivot point 122. Chain saw 20 thereby moves to the position shown in phantom in FIG. 7. During such pivotal movement and upward force applied by the operator, cam follower 60 remains against the closed end 66*a* of bucking portion 66.

As a result, dog 80 provides a secure pivot or leverage point relative to wall 100 for providing down-cutting of material 124 of wall 100. In such bucking mode, it may be appreciated that dog 80 is substantially fixed relative to chain saw 20 and acts in a manner similar to that of conventional bucking teeth. Feed mechanism 22 is distinguished over conventional bucking teeth, however, in that dog 80 engages the kerf of the workpiece rather than the surface adjacent the kerf. As previously noted, the wedge-like configuration and edge portion engagement of dog 80 within the kerf provides a secure purchase about which chain saw 20 pivots.

In the bucking mode illustrated in FIG. 7, dog 80 acts primarily as a bucking tooth, however, some feed force may be developed in response to longitudinal thrusting of chain saw along its axis 106. More particularly, as described in connection with the bucking down-cut illustrated in FIG. 7, dog 80 represents a secure pivot point for chain saw 20 when upward forces are applied to the handle 20*a* of chain 20. However, when longitudinal thrusting forces are applied, feed mechanism 22 acts in a manner similar to that illustrated in FIGS. 1-3 for providing lateral feed force as saw 20 moves toward wall 100. In the illustrated embodiment, however, the bucking mode configuration provides very little room for longitudinal thrusting of saw chain 20 toward wall 100 after dog 80 engages wall 100. The cam block 40, however, is carried by the guide bar 28 and, as chain 30 wears, guide bar 38 is moved outward away from the body of chain saw 24 to maintain tension in chain 30. As a result of such outward movement of guide bar 28 relative to power head 24, feed mechanism 22 in its bucking mode has additional space for longitudinal thrust motion toward wall 100 after dog 80 engages wall 100.

In a park mode of feed mechanism 22, lever arm 54 is rotated in a clockwise direction, as seen in FIG. 1, to move cam follower 60 into the straight portion 68 of groove 62. Pawl 53 is then disengaged from lever arm 54 and cam follower 60 is driven downward into the park portion 70 of groove 62. In such position, pawl 53 is suitably positioned for engagement of notch formation 57*a* of lever arm 54. By such engagement of pawl 53, feed mechanism 22 is locked in a park position for unobstructed use of chain saw 20.

Figure 8:
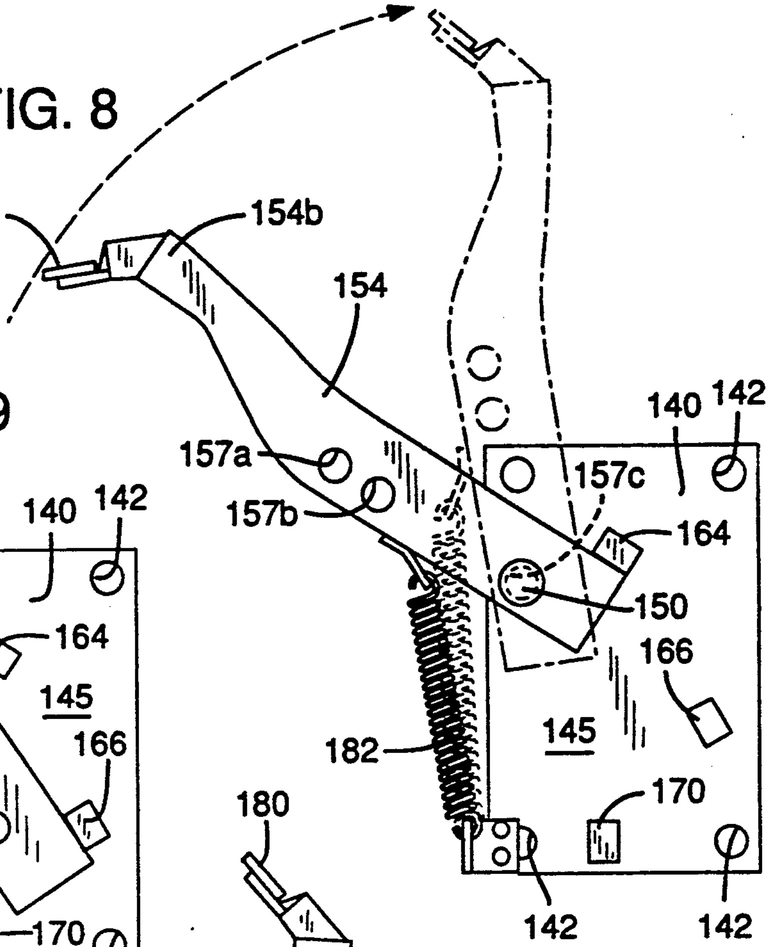
FIGS. 8-10 illustrate a second embodiment of the present invention employing a simplified lever arm.
Figure 9:
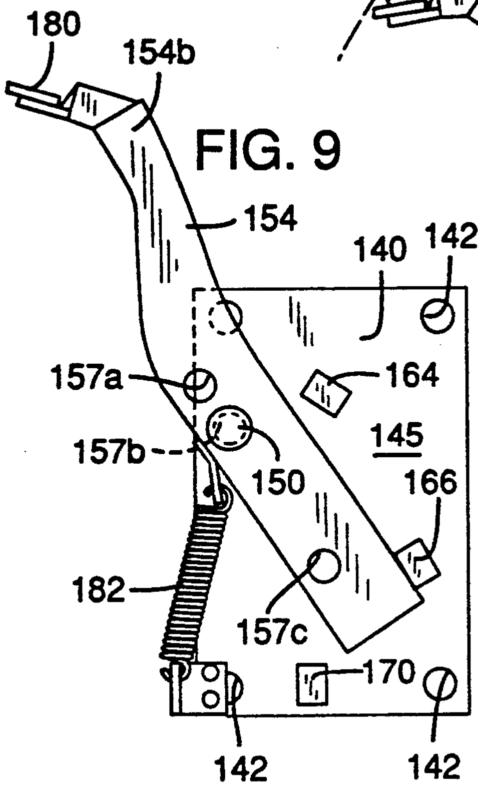
Figure 10:
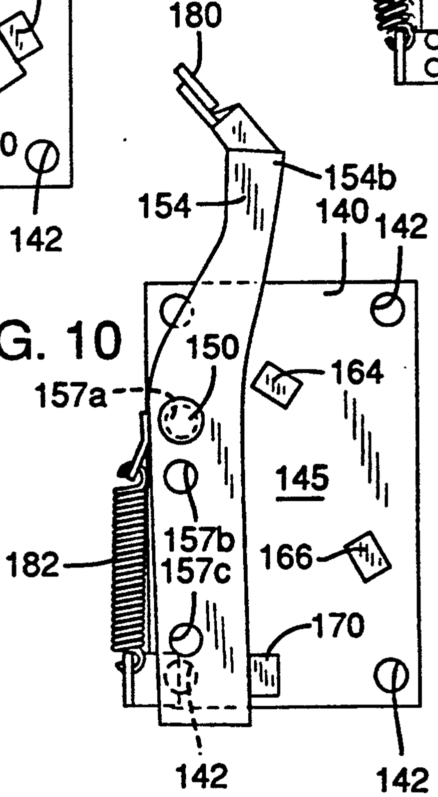

FIGS. 8-10 illustrate the feeding, bucking and park modes, respectively, of a second embodiment of the present invention employing a simplified and less expensive lever arm assembly. A mounting block 140 attaches to guide bar 28 in a manner similar to that of cam block 40 of FIG. 1 as by counter sunk apertures 142. A pivot pin 150 protrudes from the surface 145 of mounting block 140 and receives thereon a lever arm 154. Lever arm 154 includes three mounting apertures 157*a*, 157*b* and 157*c*. A spring 182 couples lever arm 154 and mounting block 140 for biasing lever arm 154 in the counter clockwise, as seen in FIGS. 8-10, direction. The distal end 154*b* of lever arm 154 carries a kerf engaging dog 180 similar to that previously described in connection with dog 80. Accordingly, lever arm 154 requires an extension bar (not shown) for positioning dog 180 within the plane of the chain saw guide bar. Such extension bar for lever arm 154 would correspond to the extension bar 86 shown in FIG. 2 for feed mechanism 22.

In the feed mode illustration of FIG. 8, mounting pin 150 inserts through a mounting aperture 157*c* of lever arm 154. Mounting block 140 includes a stop 164 for limiting travel of lever arm 154 in the counter clockwise direction. Stop 164 corresponds in function to the closed end 64*a* of feed portion 64. Thus, stop 164 positions dog 180 near the saw chain in preparation for a cutting operation.

It may be appreciated that the configuration of the feed mechanism shown in FIG. 8 corresponds generally in operation and function to that of feed mechanism 22 in its feed mode illustrated in FIGS. 1-3.

FIG. 9 illustrates the feed mechanism of FIG. 8, but in its bucking mode. More particularly, the pivot pin 150 of mounting block 140 is positioned within the aperture 157*b* of lever arm 154. A stop 166 is positioned to engage the lever arm 154 and prevent counter clockwise movement thereof. The configuration of the feed mechanism of FIG. 9 corresponds generally in operation and function to that of the feed mechanism 22 as shown in the bucking mode of FIG. 7.

FIG. 10 illustrates the feed mechanism of FIGS. 8 and 9, but shown in its park mode. More particularly, the pivot pin 150 is positioned within the mounting aperture 157*a* of lever arm 154. A stop 170 is positioned to prevent counter clockwise movement of lever arm 154 while spring 182 biases lever arm 154 in the counter clockwise direction. Lever arm 154 is thereby locked in a park position.

Figure 11:
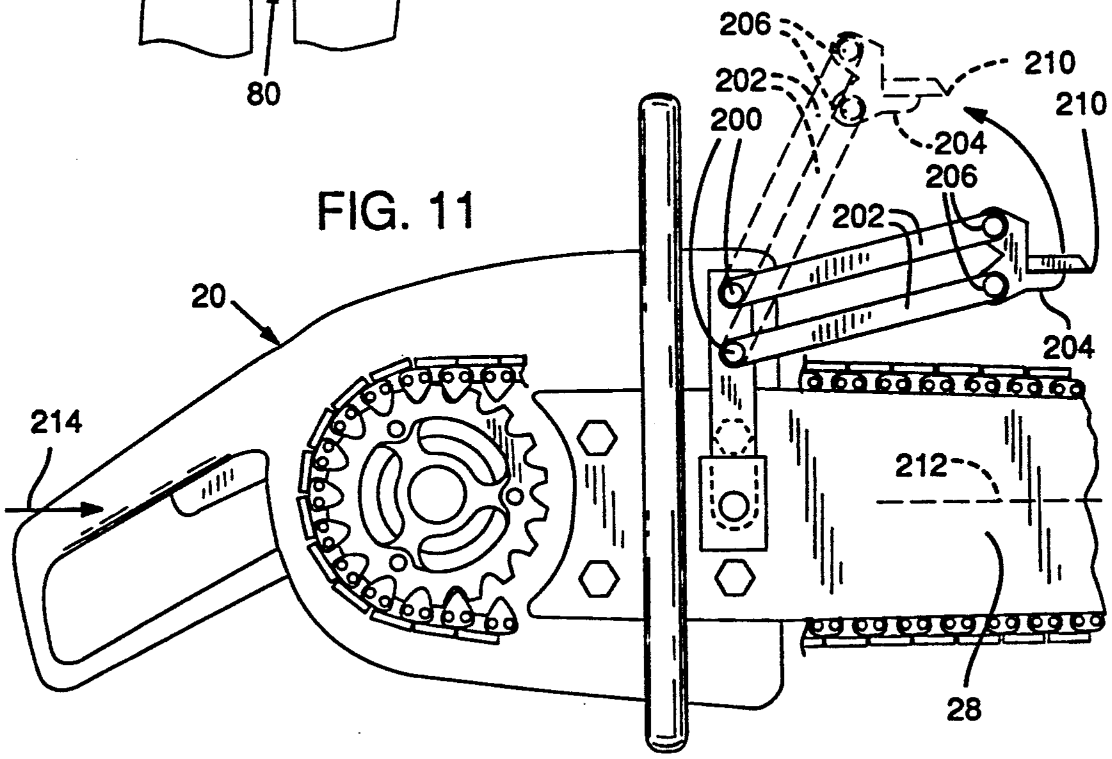
FIG. 11 illustrates a third embodiment of the present invention employing a parallelogram lever arm.

FIG. 11 illustrates a third embodiment of the present invention utilizing a parallelogram structure for the lever arm assembly. In FIG. 11, a chain saw 20 includes a pair of pivot pins 200 vertically aligned and adjacent a guide bar 28. A pair of lever arms 202 each pivotally couple to a corresponding one of pivot pins 200. A dog mounting structure 204 includes a pair of pivot pins 206 for receiving the distal ends of lever arms 202. Pivot pins 206 are vertically spaced according to the spacing of pivot pins 200. A parallelogram structure is then provided by the fixed relative positioning and alignment of pins 200 on the body of chain saw 20, the lever arms 202, and the mounting structure 204 carrying aligned pivot pins 206. Mounting structure 204 carries a kerf engaging dog 210 within the plane of guide bar 28 which may be similar to that of dog 80. The orientation of dog 210 is substantially parallel to the longitudinal axis 212 of guide bar 28 and remains in such relative parallel positioning as a result of the parallelogram structure of the lever arm assembly.

The feed mechanism of FIG. 11 thereby provides a similar lateral feed force in response to an applied longitudinal force vector 214. The feed mechanism of FIG. 11 offers the advantage of not requiring the dog 210 to pivot at the point of workpiece engagement. As a result, less damage may result to the kerf portion of the workpiece.

The feed mechanism of the present invention substantially improves the productivity of aggregate cutting applications. Experimentation has shown that conventional chain saw aggregate cutting devices accomplish approximately ten inches of cut for ten minutes of operation. In contrast, an aggregate cutting chain saw equipped with the feed mechanism of the present invention may accomplish as much as 30 inches of cut in ten minutes of operation. Additionally, it may be appreciated that the operator experiences less physical strain than that of conventional aggregate cutting chain saws. The operator may concentrate on maintaining the orientation of the saw while generally applying a leaning force into the workpiece. The operator need not apply force vectors parallel to the line of cut 111 (FIG. 4), i.e., parallel to the wall 100, but rather may apply force normal to the line of cut 111, i.e., into the wall 100. Thus, the operator may use the feed mechanism of the present invention when the cutting operation requires a difficult saw orientation or application of force vectors otherwise difficult to apply. The feed mechanism of the present invention thereby allows an operator to not only work more productively, but also work for relatively longer periods as compared to conventional aggregate cutting applications.

Thus, a feed mechanism for a cutting device has been shown as described. It may be appreciated that the present invention is not restricted to the particular embodiments that have been described and illustrated, and that variations may be made without departing from the scope of the invention as found in the appended claims and equivalents thereof. For example, while the present invention has been shown in the context of aggregate cutting chain saws, it should be understood that the scope of the invention goes beyond such cutting devices. The present invention may be applied to a variety of cutting devices other than chain saws and in a variety of applications other than aggregate cutting.

I claim:

1. A device for cutting a workpiece, the device comprising:

cutting means defining a line of cut whereby said cutting means cuts the workpiece in a direction along said line of cut in response to a feed force parallel to said line of cut;

a body carrying said cutting means;

feed means coupling said workpiece and said body and adapted for response to an applied force transverse to said line of cut and toward said workpiece to produce said feed force and urge said cutting means into movement in said direction along said line of cut; and said feed means including a lever arm pivotally coupled to said body at one end and including a workpiece engaging portion at an opposite end, said workpiece engaging portion engaging said workpiece on a side of said body opposite the cutting direction and angularly projected from said coupling toward said workpiece whereby a force applied to the body toward the workpiece and transverse to the line of cut is translated into a pivotal action induced by the lever arm including a force vector to feed the cutting means in the cutting direction.

2. A device according to claim 1 including a biasing member biasing member biasing the lever arm in the position of angular projection toward said workpiece.

3. A device according to claim 2 wherein the device includes adjustment means for modifying the distance from a pivot point on said body to said workpiece engaging portion of said arm.

4. A device according to claim 3 wherein said adjustment means comprises:

arm mounting means pivotally coupled at said pivot point to said body and adapted for slidably receiving said arm but including means for locking said arm in selectable positions relative to said mounting means;

a cam follower attached to said arm; and cam means positioned to receive said cam follower and configured to allow semi-circular movement of said cam follower along concentric paths corresponding to said locked selected positions of said arm relative to said mounting means.

5. A device according to claim 3 wherein said arm includes a plurality of pin receiving apertures along its length corresponding to selectable locked positions of said arm relative to said body, and said adjustment means comprises a pivot pin fixedly coupled to said body whereby said arm selectively mounts to said pivot pin at one of said pin receiving apertures.

6. A device according to claim 2 wherein said arm comprises a parallogram structure for maintaining a given orientation of the workpiece engaging end of said arm relative to the workpiece.

7. A device according to claim 1 wherein said device is a chain saw for cutting a kerf through an aggregate workpiece along said line of cut and said cutting means comprises a guide bar carrying a saw chain, the guide bar defining a longitudinal axis therealong, said line of cut being normal to said longitudinal axis, said feed means being operative to transfer applied force directed parallel to said longitudinal axis into feed force directed parallel to said line of out.

8. A device according to claim 7 wherein said portion comprises a dog on the end of said arm for engagement in the kerf of said workpiece.

9. A device according to claim 10 wherein said dog is wedge-shaped with leading sharpened edges for engaging the kerf in said aggregate workpiece.

10. A device according to claim 1 wherein said feed means is responsive to an applied force normal to said line of cut.

11. A device according to claim 1 wherein said device is a chain saw and said cutting means comprises a guide bar carrying a saw chain, the guide bar defying a longitudinal axis therealong, said line of cut being normal to said longitudinal axis, said feed means being pivotally coupled to said chain saw and adapted for pivotally coupling to said workpiece, said feed means being operative to transfer applied force parallel to said longitudinal axis into feed force parallel to said line of cut.

12. A feed mechanism for a chain saw having a chain saw body carrying a guide bar and having saw chain driven about said guide bar, the feed mechanism comprising:

an arm pivotally coupled to said chain saw; and a workpiece engaging member mounted at a distal end of said arm whereby upon engagement of a workpiece by said engaging member a thrusting motion of said chain saw along a longitudinal axis of the guide bar toward the workpiece pivots said arm relative to the chain saw and translates said thrusting motion into a cutting motion of said chain saw having a component transverses to said longitudinal axis.

13. A feed mechanism according to claim 12 wherein said arm is spring biased away from said chain saw body in a direction opposite the pivoting direction of said arm in response to thrusting motion.

14. A feed mechanism according to claim 12 wherein said engaging member is positioned within a plane containing said guide bar and is adapted for kerf engagement.

15. A feed mechanism according to claim 12 wherein said engaging member is positioned within a plane containing said guide bar and is adapted for pivotal kerf engagement.

* * * * *